United States Patent

Dharmapurikar et al.

(10) Patent No.: US 8,873,558 B2
(45) Date of Patent: Oct. 28, 2014

(54) REVERSE PATH FORWARDING LOOKUP WITH LINK BUNDLES

(75) Inventors: Sarang Dharmapurikar, Santa Clara, CA (US); Mahesh Maddury, San Jose, CA (US); Francisco Matus, Saratoga, CA (US)

(73) Assignee: Cisco Technology, Inc., San Jose, CA (US)

(*) Notice: Subject to any disclaimer, the term of this patent is extended or adjusted under 35 U.S.C. 154(b) by 249 days.

(21) Appl. No.: 13/136,516

(22) Filed: Aug. 3, 2011

(65) Prior Publication Data

US 2013/0034097 A1 Feb. 7, 2013

(51) Int. Cl.
*H04L 12/28* (2006.01)
*H04J 3/24* (2006.01)
*H04L 12/761* (2013.01)
*H04L 12/751* (2013.01)

(52) U.S. Cl.
CPC .............. *H04L 45/026* (2013.01); *H04L 45/16* (2013.01)
USPC ........................ 370/392; 370/395.31; 370/475

(58) Field of Classification Search
None
See application file for complete search history.

(56) References Cited

U.S. PATENT DOCUMENTS

| | | | |
|---|---|---|---|
| 6,553,028 B1 * | 4/2003 | Tang et al. ................... 370/389 |
| 2003/0165140 A1 * | 9/2003 | Tang et al. ................... 370/393 |
| 2003/0223402 A1 * | 12/2003 | Sanchez et al. ............. 370/351 |
| 2004/0205215 A1 | 10/2004 | Kouvelas et al. |
| 2006/0221962 A1 * | 10/2006 | Previdi et al. ............... 370/390 |
| 2006/0221975 A1 * | 10/2006 | Lo et al. ...................... 370/395.5 |
| 2008/0117913 A1 * | 5/2008 | Tatar et al. .................. 370/392 |
| 2008/0165778 A1 | 7/2008 | Ertemalp |
| 2008/0175269 A1 | 7/2008 | Alvarez et al. |
| 2009/0135820 A1 | 5/2009 | Suzuki |
| 2009/0161670 A1 * | 6/2009 | Shepherd et al. ............ 370/389 |
| 2009/0180400 A1 * | 7/2009 | Chiabaut et al. ............ 370/255 |
| 2010/0014442 A1 | 1/2010 | Ashwood-Smith |
| 2012/0243539 A1 * | 9/2012 | Keesara ....................... 370/392 |

OTHER PUBLICATIONS

Yogen K. Dalai et al., "Reverse Path Forwarding of Broadcast Packets", Communications of the ACM, col. 21, No. 12, Dec. 1978.

* cited by examiner

*Primary Examiner* — Christine Duong
(74) *Attorney, Agent, or Firm* — Cindy Kaplan

(57) ABSTRACT

In one embodiment, a method includes receiving a packet at an interface at a network device having a plurality of interfaces connected to a plurality of links forming a bundle, performing a Reverse Path Forwarding (RPF) check on the received packet, and forwarding the packet if it passes the RPF check. The RPF check includes a lookup in an RPF table having a plurality of entries for the bundle, each of the entries including the bundle and one of the links in the bundle, and verification that the interface receiving the packet is connected to one of the links in the bundle identified in the lookup. An apparatus is also disclosed.

17 Claims, 6 Drawing Sheets

REVERSE PATH FORWARDING LOOKUP WITH LINK BUNDLES

TECHNICAL FIELD

The present disclosure relates generally to communication networks, and more particularly, to reverse path forwarding checks.

BACKGROUND

A network device may include a plurality of interfaces connected to links forming a link bundle. The links may comprise, for example, ECMP (Equal Cost Multi-Path) members or other links forming a link bundle. A large number of links may cause problems when implementing a Reverse Path Forwarding (RPF) check. Conventional networks limit the number of links in a bundle, perform a loose RPF check (do not check the incoming interface), or completely skip the RPF check. This results in a number of drawbacks.

BRIEF DESCRIPTION OF THE FIGURES

Corresponding reference characters indicate corresponding parts throughout the several views of the drawings.

DESCRIPTION OF EXAMPLE EMBODIMENTS

Overview

Figure 1:
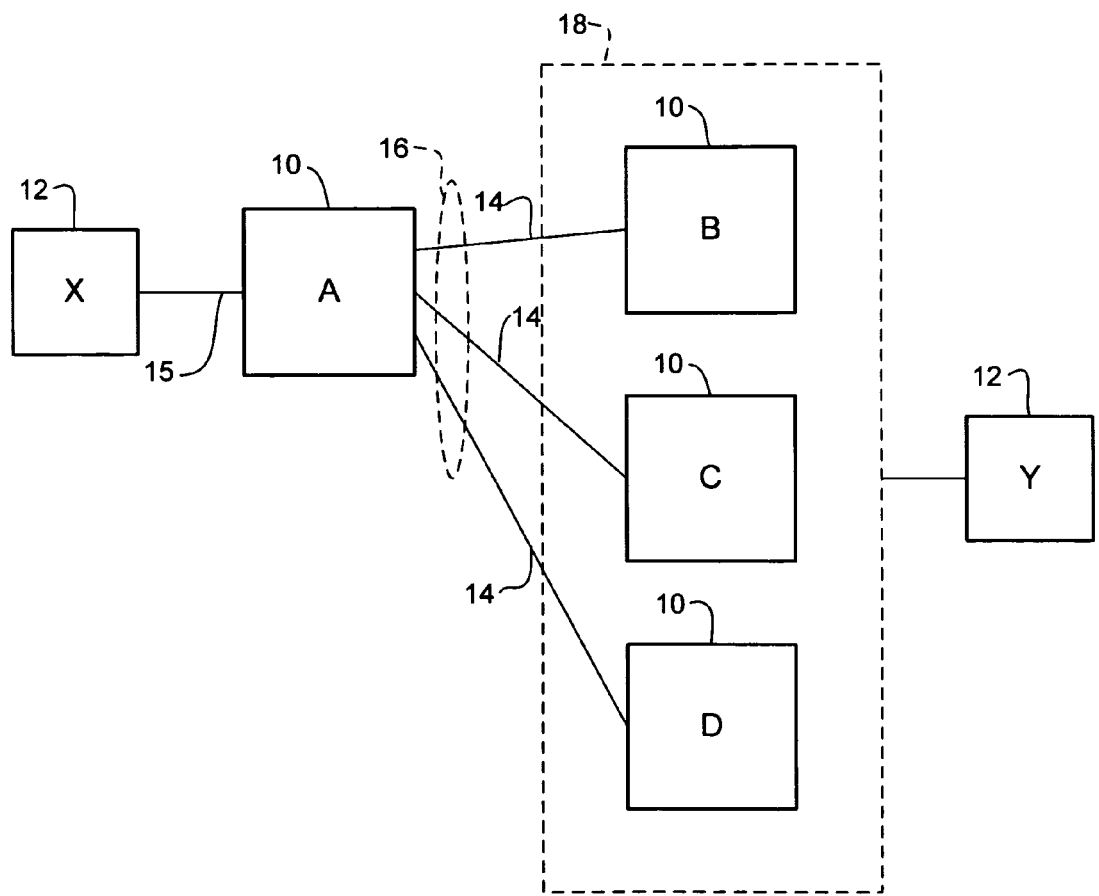
FIG. 1 illustrates an example of a network in which embodiments described herein may be implemented.

In one embodiment, a method generally comprises receiving a packet at an interface at a network device comprising a plurality of interfaces connected to a plurality of links forming a bundle, performing a Reverse Path Forwarding (RPF) check on the received packet, and forwarding the packet if it passes the RPF check. The RPF check comprises a lookup in an RPF table comprising a plurality of entries for the bundle, each of the entries comprising the bundle and one of the links in the bundle, and verification that the interface receiving the packet is connected to one of the links in the bundle identified in the lookup.

In another embodiment, an apparatus generally comprises a plurality of interfaces for connection to a plurality of links forming a bundle, a processor for receiving a packet, performing a Reverse Path Forwarding (RPF) check on the received packet, and forwarding the packet if it passes the RPF check, and memory for storing an RPF table comprising a plurality of entries for the bundle, each of the entries comprising the bundle and one of the links in the bundle. The RPF check comprises a lookup in the RPF table and verification that the interface receiving the packet is connected to one of the links in the bundle identified in the lookup.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For clarity, details relating to technical material that is known in the technical fields related to the embodiments have not been described in detail.

For purposes of illustrating example techniques of network communication, it is important to understand the types of communications that may be traversing a network. The following provides foundational information from which the present disclosure may be explained.

In unicast routing, traffic is forwarded through the network along a single path from a source to a destination host according to pre-computed routes. A unicast network device does not typically consider the source address; it considers only the destination address and how it would forward the traffic toward that destination. The network device scans through a routing or forwarding table for a match to the destination address and then forwards a single copy of the unicast packet out the correct interface in the direction of the destination.

By contrast, in multicast forwarding the source is sending traffic to an arbitrary group of hosts that are represented by a multicast group address. Multicast packets are replicated in a network at a point where paths diverge to achieve efficient data delivery to multiple receivers. In IP multicasting, the source may specify a destination IP address that may comprise a multicast group address for any number of receivers to receive the data flow. Multicast packets are sent from a source (S) address to a group (G) address. A multicast group is an arbitrary group (G) of receivers that express an interest in receiving a particular data stream from a source (S). A receiver seeking to receive data sent to a multicast group can join the group using, for example, Internet Management Group Protocol (IGMP). Join messages are typically sent from the receiver to the source and the data flow propagates in the opposite direction. Receivers that are members of a given multicast group can receive data sent to that multicast group.

Multicast-capable network devices create distribution trees that control the path that IP multicast traffic takes through the network in order to deliver traffic to all receivers. The two basic types of multicast distribution trees are source trees and shared trees. In a source tree, the multicast traffic source is the root and the branches form a spanning tree through the network to the receivers. This is also referred to as a shortest path tree (SPT) because the tree typically uses the shortest paths between the source and receiver through the network. Unlike source trees that have their root at the source, shared trees use a single common root placed at some chosen point in the network. This shared root is called a Rendezvous Point (RP).

The multicast network device must determine which direction is the upstream direction (towards the root of the tree), and which is the downstream direction (or directions). If there are multiple downstream paths, the network device replicates the packet and forwards it down the appropriate downstream paths based on receiver interest. The concept of identifying the path to reach the source, in order to get the traffic from the source via the same path, is known as Reverse Path Forwarding (RPF). RPF enables network devices to correctly forward multicast traffic down the distribution tree.

RPF check is an important concept in forwarding operations. Unicast routing techniques are used to determine a path from a receiver or intermediate node back to the tree root.

Packets received via this path from the tree root are eligible for further forwarding downstream. Packets received on other interfaces not connected to this path will not be forwarded and their receipt is referred to as RPF failure. Distinguishing upstream and downstream traffic in this way is referred to as an RPF check and helps to ensure loop-free forwarding of multicast packets and maintain security (e.g., prevent IP address spoofing or other malicious traffic) in unicast routing.

Multicast RPF may be used in connection with a multicast routing protocol such as Protocol Independent Multicast (PIM). PIM is used to dynamically create a multicast distribution tree to ensure distribution to intended receivers while limiting distribution so that network segments that are not in the path between the source and receivers are not burdened with unnecessary traffic. PIM can leverage the unicast routing protocols used to populate a unicast routing table. PIM uses this unicast routing information to perform the multicast forwarding function. Bidirectional-PIM (Bidir-PIM) is an enhancement of the PIM protocol developed to facilitate efficient many-to-many communications. With Bidir-PIM, for each RP, a router on each link is elected as a designated forwarder (DF). Using bidirectional mode, multicast groups can scale to an arbitrary number of sources with only a minimal amount of additional overhead.

The embodiments described herein allow for RPF checks across a large number of links grouped together to form a link bundle. As described below, the links may be, for example, Equal Cost Multi-Path (ECMP) members, links connected to designated forwarders, or other members (e.g., ports, interfaces, bridge domain interfaces) grouped together in a bundle. The embodiments may be used, for example, for unicast security binding checks to ensure that a packet has arrived on the correct port, or with multicast to ensure that a packet is received on a port in communication with a designated forwarder associated with a given multicast group. It is to be understood that these are only examples and that the embodiments described herein may be used in other applications, without departing from the scope of the embodiments.

Referring now to the drawings, and first to FIG. 1, an example of a network in which the embodiments described herein may be implemented is shown. The embodiments operate in the context of a data communication network including multiple network devices (nodes) interconnecting communication paths for receiving and transmitting packets of information that propagate through the network. The example shown in FIG. 1 includes network devices 10 (A, B, C, D) in communication with hosts 12 (X, Y). Network device A is in communication with host X, and network devices B, C, and D are in communication with host Y. The network device 10 may be a switch, router, or any other network device configured to perform switching, routing, or forwarding operations. The hosts 12 may be an end point, server, client device, or any other device configured to transmit, receive, or transmit and receive traffic. The hosts 12 may operate as a source (sender), destination (receiver), or both source and receiver. The traffic transmitted over the network may include data, video, audio, or any combination thereof.

Network device A in FIG. 1 includes a plurality of ports (interfaces) connected to links 14 in communication with network devices B, C, and D, and link 15 in communication with host X. In one embodiment, links 14 interconnecting network device A with network devices B, C, and D are members of an equal cost multi-path bundle 16. For simplification, only three links 14 are shown, however, there may be any number of links (e.g., 10, 100, 1000, more than eight, more than 100, etc.) in link bundle 16, connecting network device A to any number of network devices. The link bundle 16 allows the network devices B, C, and D to appear as a single logical device to network device A. The network may also be configured for Layer 2 Multi-Path (L2MP) or TRILL (Transparent Interconnect of Lots of Links), for example.

As described in detail below, the network device 10 is configured to perform reverse path forwarding checks to provide a unicast security binding check and ensure that a packet has arrived on the correct port. As previously described, RPF checks are used to verify that the reverse path for the source address matches the input port. With a link bundle there can be multiple valid source links and the network device needs to verify that the incoming link for the packet is one of the valid source links. A multi-way RPF check is performed in which the input port may be any of the input ports connected to one of the links 14 within the bundle 16. If the packet arrives on a port connected to a link within a bundle associated with a reverse path route, the packet is accepted and forwarded. If there is no reverse path route in the bundle from which the packet was received, the source address may have been modified or forged. If the RPF check does not find a reverse path for the packet, the packet is dropped (discarded).

Figure 2:
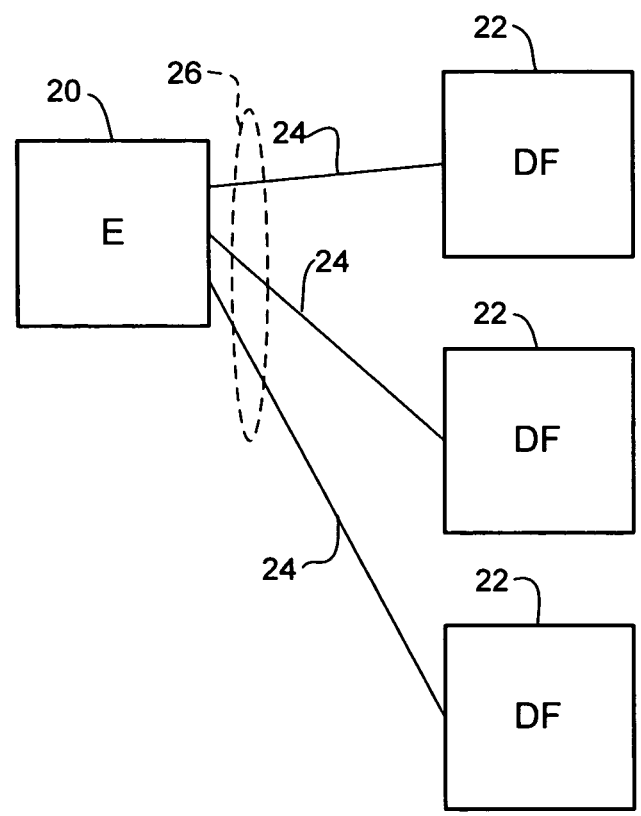
FIG. 2 illustrates another example of a network in which embodiments described herein may be implemented.

Another example of a network in which the embodiments described herein may be implemented is shown in FIG. 2. Network devices 20 and 22 are configured to transmit multicast traffic. For simplification, only a small number of nodes and links are shown. Network device 20 (E) is in communication with a plurality of network devices 22. The network devices 20, 22 may be, for example, PIM routers or any other network device configured to perform routing, switching, or forwarding operations. In one embodiment, the network device 20 is configured for Bidir-PIM and can receive packets from multiple sources through designated forwarders 22. In Bidir-PIM, the network device 20 can receive packets on a given multicast group from multiple sources subscribed to this group on different interfaces from different designated forwarders 22. An RPF check is performed to verify that the interface of an arriving packet is connected to a link that belongs to this set of interfaces (bundle 26) on which a router can expect the Bidir-PIM packets for a given multicast group It is to be understood that the networks shown in FIGS. 1 and 2 and described herein are only examples and that the embodiments may be implemented in networks having different network topologies and network devices, without departing from the scope of the embodiments.

Figure 3:
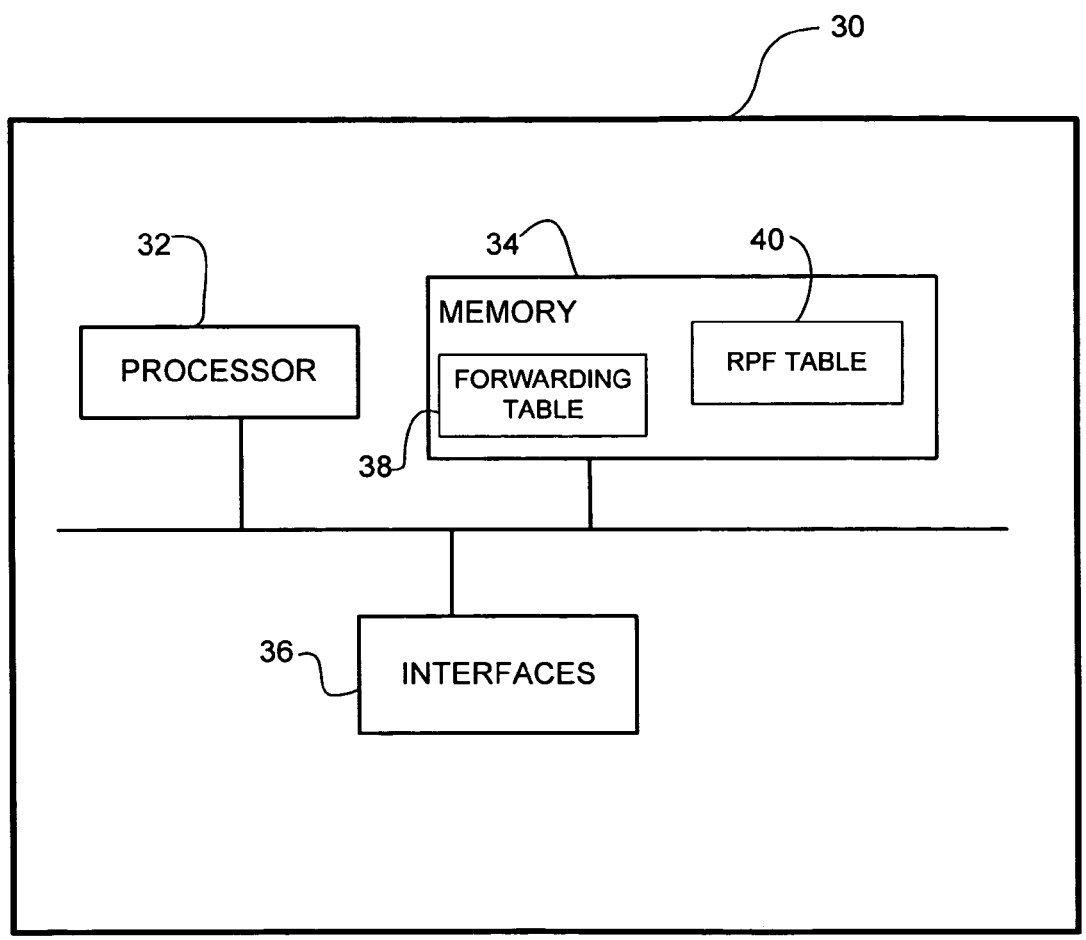
FIG. 3 depicts an example of a network device that may be used to implement the embodiments.

FIG. 3 illustrates an example of a network device (e.g., switch, router) 30 that may be used to implement the embodiments described herein. In one embodiment, the network device 30 is a programmable machine that may be implemented in hardware, software, or any combination thereof. The network device 30 includes one or more processors 32, memory 34, and network interfaces 36. Memory 34 may be a volatile memory or non-volatile storage, which stores various applications, operating systems, modules, and data for execution and use by the processor 32. For example, the memory 34 may store tables, entries, network configurations, policies, forwarding trees, etc. In one embodiment, memory 34 includes a forwarding table 38 and RPF table 40 (described further below with respect to FIG. 5). The RPF table 40 may be stored, for example, in associative storage (e.g., content-addressable memory (CAM)). The forwarding table 38 may be any data structure including one or more tables (e.g., forwarding table, routing table) or information base (e.g., forwarding information base (FIB), routing information base (RIB)) etc. The FIB may include ECMP information, for example.

Logic may be encoded in one or more tangible media for execution by the processor 32. For example, the processor 32 may execute codes stored in a computer-readable medium such as memory 34. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

An operating system, portions of which may be resident in memory 34 and executed by the processor 32, may functionally organize the network node by invoking network operations in support of software processes executing on the processor. These software processes may include, for example, a PIM module, which relies on an underlying topology-gathering protocol to populate the forwarding table 38 to establish and maintain paths or routes.

The network interfaces 36 may comprise any number of interfaces (linecards, ports) for receiving data or transmitting data to other devices. The interfaces 36 may include, for example, an Ethernet interface for connection to a computer or network.

It is to be understood that the network device 30 shown in FIG. 3 and described above is only one example and that different configurations of network devices may be used.

Figure 4:
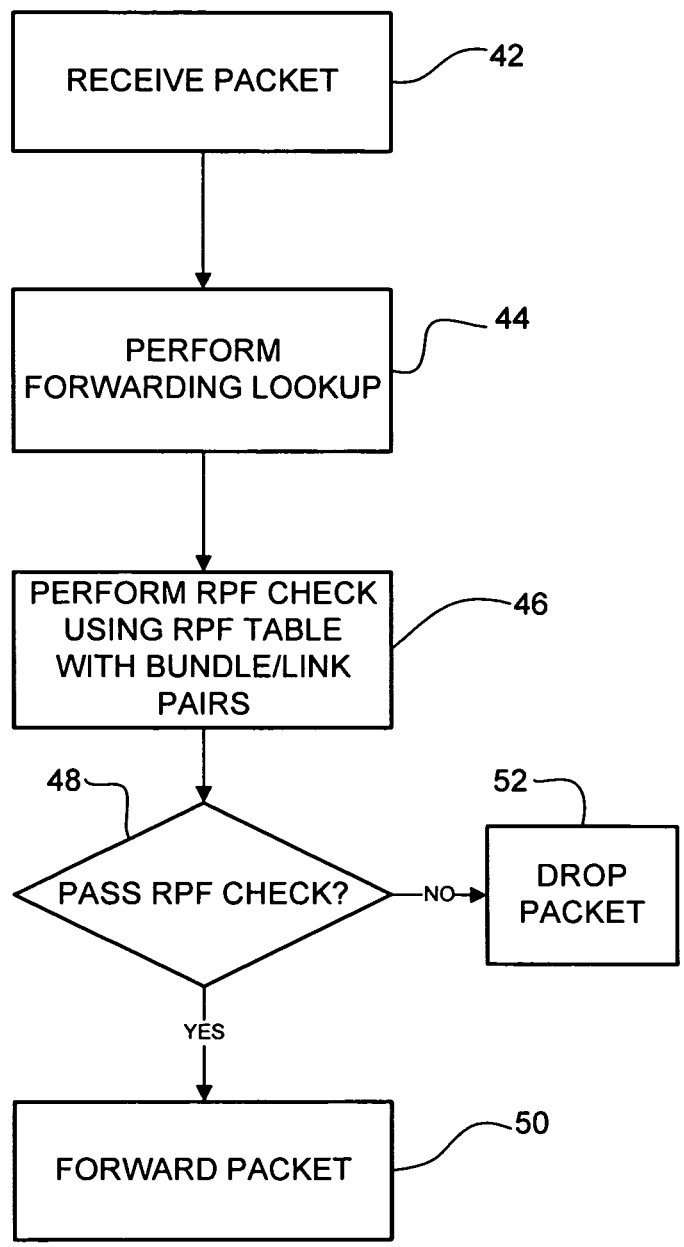
FIG. 4 is a flowchart illustrating an overview of a process for performing a reverse path forwarding check, in accordance with one embodiment.

FIG. 4 is a flowchart illustrating an overview of a process for performing a reverse path forwarding check, in accordance with one embodiment. At step 42, the network device receives a packet. The network device performs a forwarding lookup (e.g., lookup in forwarding or routing table 38) based on a destination address in the packet (step 44). The network device also performs a reverse path forwarding check (step 46). The RPF check may be based on a source address in a unicast packet or may be based on a destination address (multicast group) in a multicast packet. As described in detail below, the RPF check includes a lookup in an associative data structure (e.g., RPF table 40) configured to allow for RPF checks across a large number of links in a bundle. The lookup identifies a bundle and link associated with the source address or multicast group in the packet. The RPF check verifies that the interface on which the packet was received is connected to one of the links in the bundle identified in the lookup. If the packet passes the RPF check (step 48), the packet is forwarded based on the results of its forwarding lookup at step 44 (step 50). If the packet does not pass the RPF check, it is dropped (step 52). The RPF check fails if the lookup fails (no entry found in RPF table) or if the link (interface) on which the packet was received belongs to a different bundle than identified in the source address lookup in the RPF table.

It is to be understood that the process shown in FIG. 4 and described above is only one example and that steps may be added, removed, reordered, or combined without departing from the scope of the embodiments.

The following describes one example for RPF check operations (step 46 in FIG. 4):

```
RPF_check (packet)
    if (packet is unicast)
        SA_info = FIB.lookup(packet.SA)
        if (SA_info.multipath_enabled) //This address is reached
            through a
            bundle of multiple equal cost paths/interfaces
            //Check to see if the interface packet was received on is a
            member of this bundle using an associative lookup.
            rpf_pass = RpfTable.Lookup(SA_info.BUNDLE_ID,
            paket.incoming_interface)
        else //This SA is reached through a single path/interface
        end if
    else
```

```
        G_info = FIB.lookup(packet.DA) //Lookup the Destination
        Address
        (DA) also known as Multicast Group (G)
        if (G_info.bidir_PIM_enable)
            //In BIDIR-PIM, packets can be received on a given
            Multicast
            Group from different sources subscribed to this group on
            different interfaces from different designated forwarders
            (DFs)
            //Check to see if the interface packet was received on is
            one on which packets are received for given Multicast
            Group
            using an associative lookup.
            rpf_pass = RpfTable.Lookup(G_info.BUNDLE_ID,
            packet.incoming_interface)
        else
            //no associative lookup
        end if
    end if
end
```

Figure 5:
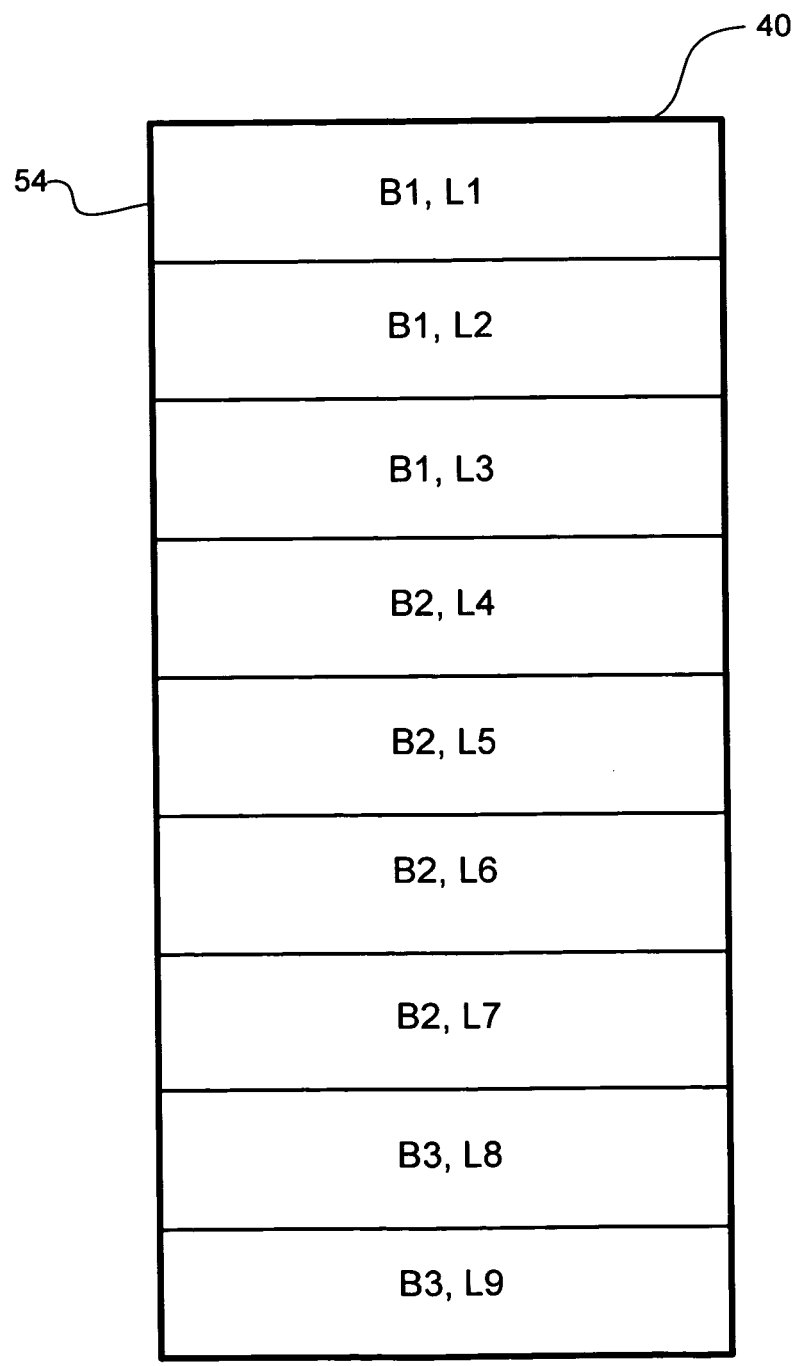
FIG. 5 depicts an example of a reverse path forwarding table, in accordance with one embodiment.
Figure 6:
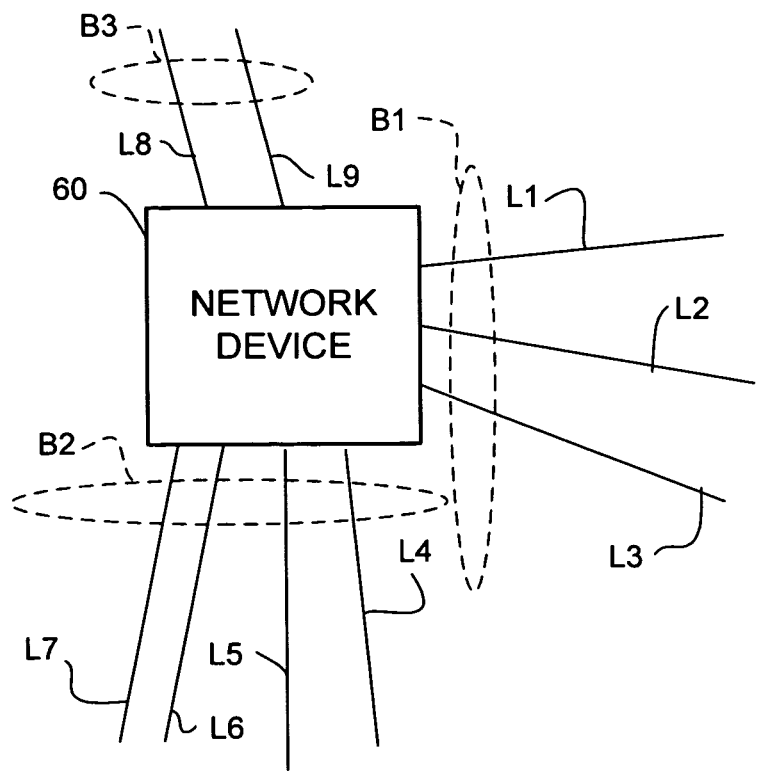
FIG. 6 illustrates an example of a network device in communication with a plurality of links associated with link bundles corresponding to the table of FIG. 5.

FIG. 5 shows an example of RPF table 40, in accordance with one embodiment. The RPF table 40 includes a plurality of entries 54, each entry comprising a (bundle, link) pair. The bundles and links may be identified using any appropriate identifier (e.g., bundle ID, interface ID, bridge domain, adjacency, etc.). The entries 54 in the RPF table 40 shown in FIG. 5 correspond to network device 60 shown in FIG. 6. FIG. 6 illustrates network device 60 comprising a plurality of ports (interfaces) connected to a plurality of links. Links L1, L2, and L3 belong to bundle B1, links L4, L5, L6, and L7 belong to bundle B2, and links L8 and L9 belong to bundle B3. The links may be, for example, ECMP members or links connected to multicast sources and recipients in PIM-Bidir, as described above with respect to FIGS. 1 and 2.

In one embodiment, table 40 is a hash table and the lookup is performed using the source or destination address in the received packet, as previously described. The lookup is preferably performed in hardware to speed up packet forwarding operations. It is to be understood that the table shown in FIG. 5 and described herein is only an example and that other data structures may be used, without departing from the scope of the embodiments. For example, the table 40 may be any type of associative array configured for use with a lookup or indexing operation to find a value (e.g., bundle/link pair) associated with a key (e.g., source address, destination address), wherein the array maps (binds) the key to the value.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:

receiving a packet at an interface at a network device comprising a plurality of interfaces connected to a plurality of links forming a bundle, said bundle associated with a reverse path route;

performing a Reverse Path Forwarding (RPF) check on the received packet, wherein performing said RPF check comprises performing a security binding check for unicast; and forwarding the packet if the packet passes said RPF check; wherein said RPF check comprises:

a lookup in an RPF table comprising a plurality of entries for said bundle, each of said entries comprising said bundle and one of the links in said bundle; and verification that the interface receiving the packet is connected to one of the links in said bundle identified in said lookup;

wherein the received packet passes said RPF check if the interface receiving the packet is connected to one of said plurality of links within said bundle.

2. The method of claim 1 wherein said bundle comprises an equal cost multi-path bundle and the lookup is based on a source address in the packet.

3. The method of claim 1 wherein said plurality of links are connected to Protocol Independent Multicast (PIM) routers and said lookup is based on a multicast group address in the packet.

4. The method of claim 3 wherein the network device is configured for bidirectional-PIM operation and said plurality of links are in communication with designated forwarders.

5. The method of claim 1 wherein the RPF table comprises a hash table.

6. The method of claim 1 wherein the RPF table comprises a plurality of entries for at least one other bundle.

7. The method of claim 1 wherein said bundle comprises more than eight links.

8. The method of claim 1 wherein said bundle comprises more than one hundred links.

9. An apparatus comprising:

a plurality of interfaces for connection to a plurality of links forming a bundle, said bundle associated with a reverse path route;

a processor for receiving a packet, performing a Reverse Path Forwarding (RPF) check on the received packet, and forwarding the packet if the packet passes said RPF check, wherein performing said RPF check comprises performing a security binding check for unicast; and memory for storing an RPF table comprising a plurality of entries for said bundle, each of said entries comprising said bundle and one of the links in said bundle;

wherein said RPF check comprises a lookup in the RPF table and verification that one of said plurality of interfaces receiving the packet is connected to one of the links in said bundle identified in said lookup and wherein the received packet passes said RPF check if the interface receiving the packet is connected to one of said plurality of links within said bundle.

10. The apparatus of claim 9 wherein said bundle comprises an equal cost multi-path bundle and said lookup is based on a source address contained in the packet.

11. The apparatus of claim 9 wherein said plurality of links are connected to Protocol Independent Multicast (PIM) routers and said lookup is based on a multicast group address in the packet.

12. The apparatus of claim 11 wherein the processor is configured for bidirectional-PIM operation and said plurality of links are in communication with designated forwarders.

13. The apparatus of claim 9 wherein the RPF table comprises a hash table.

14. Non-transitory computer readable media comprising encoded logic for execution and when executed operable to:

perform a Reverse Path Forwarding (RPF) check on a packet received at an interface at a network device, wherein performing said RPF check comprises performing a security binding check for unicast, the network device comprising a plurality of interfaces for connection to a plurality of links forming a bundle, said bundle associated with a reverse path route; and forward the packet if the packet passes said RPF check;

wherein said RPF check comprises:

a lookup in an RPF table comprising a plurality of entries for said bundle, each of said entries comprising said bundle and one of the links in said bundle; and verification that the interface receiving the packet is connected to one of the links in said bundle identified in said lookup;

wherein the received packet passes said RPF check if the interface receiving the packet is connected to one of said plurality of links within said bundle.

15. The non-transitory computer readable media of claim 14 wherein said bundle comprises an equal cost multi-path bundle and said lookup is based on a source address in the packet.

16. The non-transitory computer readable media of claim 14 wherein said plurality of links are connected to Protocol Independent Multicast (PIM) routers and said lookup is based on a multicast group address in the packet.

17. The non-transitory computer readable media of claim 14 wherein the network device is configured to perform the lookup in hardware.

* * * * *